United States Patent [19]

Brodoway

[11] 4,399,263

[45] Aug. 16, 1983

[54] MODIFICATION OF ETHYLENE/ACRYLATE/CARBOXYLIC POLYMER

[75] Inventor: Nicolas Brodoway, Wilmington, Del.

[73] Assignee: E. I. Du Pont de Nemours & Co., Wilmington, Del.

[21] Appl. No.: 334,160

[22] Filed: Dec. 24, 1981

[51] Int. Cl.$^3$ ............................................... C08F 8/30
[52] U.S. Cl. ................................. 525/382; 525/327.6; 525/329.6; 525/374; 525/379; 525/381; 526/272; 526/304; 528/481; 528/503
[58] Field of Search ............... 525/329, 374, 378, 379, 525/381, 382, 327.6, 329.6; 526/272, 304; 528/481, 503

[56] References Cited

U.S. PATENT DOCUMENTS

| | | | |
|---|---|---|---|
| 2,599,123 | 6/1952 | Pinkney et al. | 525/381 |
| 3,048,487 | 8/1962 | Minsk et al. | 525/382 |
| 3,404,134 | 10/1968 | Rees | 260/78.5 |
| 3,702,782 | 11/1972 | Barozier et al. | 117/118 |
| 3,840,499 | 10/1974 | DiGiulio | 260/78.5 T |
| 3,883,472 | 5/1975 | Greene et al. | 260/42.52 |
| 3,904,588 | 9/1975 | Greene | 260/78.5 R |
| 3,998,994 | 12/1976 | Decroix et al. | 526/15 |
| 4,026,851 | 5/1977 | Greene | 260/23 A R |

OTHER PUBLICATIONS

Noller, Chemistry of Organic Compounds, pp. 738–739 (1952), Published by W. B. Saunders Co., Philadelphia, Pa.

Du Pont Technical Bulletin EA-310.1, "Safe Processing Diamine Curing Systems", by J. F. Hagman.

Research Disclosures 16519, 16521 dated 1/78.

*Primary Examiner*—Harry Wong, Jr.

[57] ABSTRACT

Elastomeric ethylene/alkyl acrylate/1,4-butenedioic acid ester copolymers are stabilized against variations in cure characteristics by reaction of such polymers with amines, perferably during isolation of such polymers. In addition, substantial increase in the molecular weight of such polymers is achieved if the amines are di- or polyamines.

6 Claims, No Drawings

MODIFICATION OF ETHYLENE/ACRYLATE/CARBOXYLIC POLYMER

TECHNICAL FIELD

This invention relates to the preparation of ethylene-/alkyl acrylate/1,4-butenedioic acid ester polymers in a high pressure polymerization process, in particular to a process for increasing the hydrolytic stability and uniformity of such copolymers while at the same time increasing polymer molecular weight.

It has been observed that ethylene/alkyl acrylate/1,4-butenedioic acid ester polymer which has been stored for several months at ambient conditions cures satisfactorily, but that the same polymer cured immediately or shortly after polymerization exhibits uneven and sometimes scorchy cure characteristics.

It is the purpose of the present invention to produce ethylene/alkyl acrylate/1,4-butenedioic acid ester copolymers which have cure characteristics that are predictable and stable over time. Additionally, the process of the present invention effectively and efficiently increases the molecular weight of the ethylene/alkyl acrylate/1,4-butenedioic acid ester copolymers, enabling significant economies in the polymerization process.

BACKGROUND ART

U.S. Pat. No. 3,904,588, granted Sept. 9, 1975, to Greene discloses certain ethylene/alkyl acrylate/1,4-butenedioic acid ester copolymers. The present invention is useful in stabilizing the polymers disclosed by Greene.

Diamine cures of ethylene/alkyl acrylate/1,4-butenedioic acid ester polymers are disclosed in U.S. Pat. No. 4,026,851, granted May 31, 1977, to Greene, U.S. Pat. No. 3,883,472, granted May 13, 1975, to Greene and Lewis, and in Du Pont Technical Bulletin EA-310.1, "Safe-Processing Diamine Curing Systems" by J. F. Hagman. However, as specifically stated in Hagman (and supported by the disclosure of Greene and Greene and Lewis) diamines react very slowly with the carboxyl cure site and require the addition of accelerators or catalysts for practical cure rates.

DISCLOSURE OF THE INVENTION

It has been found that if temperatures above 150° are maintained for sustained periods (10 minutes or more) during isolation of ethylene/alkyl acrylate/1,4-butenedioic acid ester polymers, a significant number of anhydride moieties are formed along the polymer chain by internal reaction at the ester-acid cure site. Aafter isolation, the anhydrides are slowly hydrolyzed to diacids under ambient conditions. The anhydrides are much more reactive with the standard amine cure systems than are the diacids. Thus, such alteration of the cure site causes polymer properties and cure characteristics to change with time resulting in undesirable variations between samples of different ages.

This invention relates to a method for increasing the hydrolytic stability and uniformity of ethylene/alkyl acrylate/1,4-butenedioic acid ester terpolymers prepared in a continuous high pressure polymerization process. More specifically, it has been found that if a polymer composition prepared by such process, having a melt flow range (2160g, 190° C.) of 10–30 dg/min. (ASTM test method D-1238-52T, ASTM Standards 1955), is reacted with a mono-, di- and/or polyamine, a hydrolytically stable, processible elastomer is formed. Additionally, the molecular weight of the polymer is effectively and efficiently increased giving an additional benefit. Thus, if it is desired to produce a polymer having a particular molecular weight desirable for further compounding, this result can now be achieved by preparing a lower molecular weight polymer in the polymerization reactor (e.g by decreasing the residence time in the reactor) and then treating the resultant polymer with one or more of monoamine, diamine or polyamine (without catalyst or accelerator) according to the process of the present invention.

When ethylene/alkyl acrylate/1,4-butenedioic acid ester terpolymers are prepared in a continuous process as described in U.S. Pat. No. 3,904,588, or in copending U.S. patent application No. 258,442, filed Apr. 28, 1981 by Bollmeier et al., it has been observed that products having cure characteristics which vary with time are often isolated. For example, polymer scorch may range from 5 min. in newly synthesized samples to 15 min. in aged samples. This variability is belived to result from the presence of anhydride linkages along the polymer chain of scorchy samples. The preferred amine curing agents react more rapidly with these groups than with the normal carbxlic cure site, resulting in more rapid onset of cure in samples containing anhydride and, hence, scorchy polymer.

In the Bollmeier process, polymers disclosed in U.S. Pat. No. 3,904,588 are prepared by continuous polymerization in an agitated autoclave, in the presence of aromatic antioxidant, preferably 2,6-di-t-butyl-4-methylphenol, at 179–193 MPa and 140°–180° C. The reaction mixture is then depressurized across a valve, creating a vapor/liquid reaction mixture. Vapor/liquid separation is accomplished in a high pressure separator at 13–14.5 MPa and 170°–200° C. Between 85–98% of the gas is recycled, while the remainder passes with the polymer through a valve to a low pressure separator, which operates at 0.021–0.276 MPa (3–40 psi) and 150°–180° C. The resultant product polymer contains 30–60% of the antioxidant fed to the process. An additional 5–10% of the antioxidant is found in the product polymer as reaction products. The remainder of the antioxidant is recycled with the recovered vapors. Vapor from the low pressure separator is routed, for reprocessing or disposal.

A 5–25% (by weight) solution of antioxidant in mineral spirits is injected into the process stream prior to ethylene injection, and is mixed with the high pressure separator off-gas. (Alternatively the antioxidant can be conveniently mixed with the ethylene or with the makeup monomers and injected therewith.) Fresh ethylene is added, and the gas stream is cooled to 20°–100° C., where 20–50% of the antioxidant is condensed. The mixture of recycled vapors, fresh ethylene and makeup antioxidant is treated to remove wax or any other undesirable impurities and is then compressed to 41.5–55 MPa. Makeup methyl acrylate and monoalkyl ester of 1,4-butenedioic acid are injected into the process stream (optionally with additional antioxidant). The resultant mixture is then further compressed to 179–193 MPa at 20°–80° C. Initiator, preferably a peroxy dicarbonate, is then added, and the mixture is fed to the autoclave. In the preparation of the preferred polymers disclosed in U.S. Pat. No. 3,904,588, the total monomer feed rate can be from 23–113,000 kg (50 pounds-250,000 pounds) per hour. The relative monomer feed rates are adjusted such that the steady state concentration of monomers in the reactor will correspond to a molar ratio of ethylene to methyl acrylate of from about 35:1 to about 115:1, depending upon the desired finished product which may range in ethylene content from 28–59.5 weight percent, in methyl acrylate content from 40–62 weight percent and in monoalkyl ester of 1,4-butenedioic acid from 0.5–10 weight percent. Preferred ethylene/methyl acrylate molar ratios in the reactor will range from 42:1 to 70:1 with the most preferred being about 57:1.

It is believed that the anhydride groups arise from internal reaction of the normal cure site when temperatures of 150° C. or more are maintained for periods longer than 5 minutes during the isolation procedure, such as is likely to occur in the low pressure separator used in the commercial embodiment of the Bollmeier et al. process. Between 5 and 15 mole % of the units derived from the unsaturated dioic ester monomer are converted to hydrolytically unstable anhydride groups. The creation of anhydride groups under conditions such as are likely to occur in Bollmeier's low pressure separator was not previously known, and it was the discovery of the presence of such phenomenon that led to the present invention.

Anhydride content of the polymer can be lowered to an acceptable level by storing the polymer under conditions which maximize hydrolysis. This, however, requires allocation of warehouse space for an extended period of time. The same objective can be realized more rapidly by adding monoamines, diamines, polyamines or mixtures of monoamines and di- and polyamines to the polymer, e.g. in an extruder/pelletizer. Although stabilization of the polymer would result from addition of any class of amine and subsequent conversion of the anhydride to acid-amide groups, if a di- or polyamine is used, an additional advantage accrues. The molecular weight of the polymer may be modified by partially crosslinking the composition. Thus, a polymer of low molecular weight can be produced initially, and molecular weight can subsequently be raised to any desired level during isolation. Such a procedure allows the rate of polymer production to be raised while still yielding a final product which has acceptable processing properties. If the only objective is to achieve polymer stabilization (without varying the molecular weight) this will be accomplished by using monoamine, and such monoamine can be used in excess, if desired.

Amines suitable for use in the process of the present invention include diamines, polyamines or mixtures of monoamines and di- or polyamines. Amine generators, such as carbamates or amine salts of weak acids also can be used. Suitable commercially available diamines and polyamines include hexamethylenediamine, ethylenediamine and methylenedianiline, diethylenetriamine and tetraethylenepentamine. Examples of monoamines which can be used in multi-component systems are dibutylamine, dilaurylamine, stearylamine or aniline. The most preferred amine is hexamethylenediamine.

The amine can be added at any point subsequent to formation of the anhydride. In the preparation of ethylene/alkyl acrylate/1,4-butenedioic acid ester terpolymer as taught by Bollmeier et al., it is preferable to add the amine reactant to the polymer after it has been removed from the low pressure separator. This insures that no amine enters the recycle loop.

The advantages to be derived from the process of the present invention can be maximized by preparation of ethylene/alkyl acrylate/1,4-butenedioic acid ester terpolymer of lower than normal molecular weight, i.e. a polymer having melt flow range (2160 g, 190° C.) of 10–30 dg/min. with a preferred range of 15–20 dg/min. Such polymer can be prepared for example as disclosed by Bollmeier et al. under continuous high pressure conditions. Typically, the polymer will be isolated from the reaction mass by passage through a high pressure separator, and then through a low pressure separator. Temperature in the low pressure separator can be up to about 200° C., but it is necessary to maintain a temperature of at least 140° C., preferably about 150°–180° C., to encourage conversion of the carboxylic cure site to anhydride. Residence time in the low pressure separator should preferably be adjusted to allow conversion of enough carboxylic cure site to anhydride so that the final anhydride content of the polymer is 0.02–0.05 mole/kg. Subsequent reaction of the polymer with amine according to the process of the present invention will bring the molecular weight of the polymer to a desirable level and result in a polymer whose cure characteristics are stable.

DESCRIPTION OF THE PREFERRED EMBODIMENTS

Ethylene, alkyl acrylate and 1,4-butenedioic acid ester monomers are continuously polymerized in an agitated autoclave at 179–193 MPa and 140°–180° C. The reaction mixture is then depressurized across a valve, creating a vapor/liquid reaction mixture. Vapor/liquid separation is accomplished in a high pressure separator, at 13–145 MPa and 170°–200° C. Between 85–98% of the gas is recycled through cleanup, recompression and reaction equipment while the remainder passes with the polymer through a valve to a low pressure separator, which operates at 0.021–0.276 MPa (3–40 psi) and 150°–180° C. Residence time in the reactor (i.e. autoclave) is maintained at about 10 sec. to 45 sec. to produce polymer having a melt flow range (2160 g, 190° C.) of 10–30 dg/min., preferably 15–20 dg/min. This would correspond to a weight average molecular weight of approximately 170,000 to 230,000. Residence time in the low pressure separator is maintained at about 5 to 15 min. to produce polymer in which the anhydride content is about 0.01–0.1 mole/kg of polymer, preferably 0.02–0.05 mole/kg. The polymers, essentially free of monomers, pass through a valve to an extrude/pelletizer at which point amines are added. Preferred amines include dibutylamine or dilaurylamine (more preferably in combination with di- or polyamines) hexamethylenediamine, ethylenediamine, methylenedianiline, diethylenetriamine, and tetraethylenepentamine. The diamines are more preferred, with hexamethylenediamine most preferred. The di- or polyamine is added to the polymer at about 0.01–0.03 equivalents or amine/kg of polymer, preferably 0.014–0.02 equivalents/kg. The monoamine is added in an amount needed to completely convert the excess anhydride to acid amide.

The experiments described in the following examples were all conducted in an experimental facility which was operated substantially as described above. In each of the following examples, parts and percentages are by weight and temperatures are in degrees Celsius unless otherwise specified.

EXAMPLE 1

Preparation of Polymer Containing Anhydride Groups

About 550 grams of a copolymer having the approximate composition 40% ethylene, 56% methyl acrylate, and 4% 1,4-butenedioic acid monoethylester by weights and a melt flow rate (2160 g, 190° C.) of 19.6 and a Mooney Viscosity of 13.5 (ML-1+4 at 100° C.), were heated at 175° C. (200 mm) and a slow nitrogen bleed for three hours. The polymer was then cooled and mixed on a rubber mill to homogenize the sample and an aliquot was analyzed to determine the amount of anhydride present. Found: 0.056 mole per kilogram of polymer. The heat treatment did not alter the bulk viscosity of the copolymer.

EXAMPLES 2 and 3

Treatment of Polymer with Hexamethylenediamine

Portions of the polymer of Example 1 were mixed on a rubber mill in the following recipes:

| Ingredient | Example 2 | Example 3 |
|---|---|---|
| Polymer of Example 1 | 100 g | 100 g |
| Hexamethylenediamine carbamate | 0.135 g (0.0016 eq.) | 0.18 g (0.0022 eq.) |
| n-Dodecanol | 1.0 g | 1.0 g |

Each compound was extruded at 180° C. with a residence time at 180° C. of about three minutes. Mooney viscosities measured at 100° C. (ML-1+4) on the extrudates were 18.5 and 21.5 respectively. The polymer of Example 1 had a Mooney viscosity of 13.5.

After aging the remainder of the extrudates for two days at 50° C. the following analyses were performed:

| Ingredient | Example 2 | Example 3 |
|---|---|---|
| % Gel in THF at 25° C. | 0.2 | 0.7 |
| Inherent viscosity (0.1 g in 100 ml decalin at 135° C.) | 1.10 | 1.19 |
| Anhydride content (% maleic anhydride) | 0.39 | 0.30 |

The n-dodecanol reacts very slowly with the anhydride since the reduction in anhydride content corresponded to the diamine addition only.

EXAMPLE 4

Preparation of Polymer Containing Anhydride Groups

About 1800 grams of a copolymer of composition similar to that of Example 1 but having a melt flow rate of 9.4 was heated as in Example 1 for 105 minutes. The anhydride content was measured as 0.035 mole per kilogram of polymer.

EXAMPLES 5 and 6

Treatment of Polymer with Hexamethylenediamine

The product of Example 4 was compounded on a rubber mill as follows:

| | Example 5 | Example 6 |
|---|---|---|
| Polymer of Example 4 | 100 g | 100 g |
| Hexamethylenediamine carbamate | 0.135 g (0.0016 eq.) | — |
| Di-n-butylamine | 0.9 g | 0.9 g |
| | (0.070 eq.) | (0.070 eq.) |

Each stock was extruded with the head and die of the extruder heated at 180° C. and the residence time of the polymer at 180° C. of about 1.2 minutes. 100 parts of each polymer were mixed with 20 parts of carbon black (N770), 1 part of "Polygard" (tris-(monophenyl)-phosphite antioxidant), 1 part of "Naugard" 445 (substituted diphenylamine antioxidant), and 2 parts of "Carbowax" 4000 (polyethylene oxide release agent). The Mooney viscosity (ML-1+4 at 100° C.) of the compound of Example 5 was 23.5 and of Example 6 was 18.

EXAMPLES 7-10

Treatment of Polymer with Various Amines

A polymer prepared as in Example 4 but containing 0.107 mole of anhydride per kilogram of polymer was mixed on a rubber mill as follows:

| | Example | | | |
|---|---|---|---|---|
| | 7 | 8 | 9 | 10 |
| Polymer (1.05% anhydride) | 100 | 100 | 100 | 100 |
| Carbon Black (N770) | 20 | 20 | 20 | 20 |
| Hexamethylenediamine | 0.116 (0.002 eq.) | — | — | — |
| Methylenedianiline | — | 0.2 (0.002 eq.) | — | — |
| Ethylenediamine | — | — | 0.06 (0.002 eq.) | — |
| Tetraethylenepentamine | — | — | — | 0.075 (0.0017 eq.) |
| Dibutylamine | 1.0 | 1.0 | 1.0 | 1.0 |
| Mooney viscosity at 100° C. (ML-1+4) | 36 | 39 | 40.5 | 33 |

Stocks were aged three days at 70° C. before measuring Mooney viscosity.

These examples shown that both aromatic and aliphatic primary diamines and aliphatic secondary polyamines add rapidly to the anhydride moiety and are capable of modifying the bulk viscosity at moderate temperatures.

EXAMPLE 11

Treatment of Polymer with Hexamethylenediamine

A compound was mixed as in Example 7 except that the hexamethylenediamine content was 0.1 part instead of 0.116 part. After storage at room temperature for one day the Mooney viscosity (ML-1+4) at 100° C. was 23 and after six days was 23.5. Heating the stock for 25 minutes at 170° C. after storage for six days at room temperature raised the Mooney viscosity by only 1.5 points.

This example shows that a rapid change in bulk viscosity is attained at room temperature.

EXAMPLES 12–14

Treatment of Polymer with Various Quantities of Hexamethylenediamine

The copolymer of Example 1 was mixed with hexamethylenediamine carbamate as shown below followed by a short heating period at 180° C.

|  | Example | | |
|---|---|---|---|
|  | 12 | 13 | 14 |
| Polymer of Example | 100 g | 100 g | 100 g |
| Hexamethylenediamine carbamate | 0.125 g (0.0016 eq.) | 0.18 g (0.0025 eq.) | 0.22 g (0.0028 eq.) |
| Melt flow rate | 5.5 dg/min | 1.5 dg/min | 0.15 dg/min |
| % Gel in THF at 25° C. | 1.7 | 2.2 | 11.8 |

These examples show the dependence of polymer viscosity on diamine content and limitations by onset of gel formation.

EXAMPLE 15

Anhydride Content of Untreated Polymer Over Time

Polymer prepared in a manner similar to that desceibed in Example 1 was separated into aliquots and aged in the presence of water (0.5–1%) at ambient temperature for various periods from 1–49 days. Aged polymer samples were analyzed for anhydride content. Results are shown below:

| Sample Age (days) | Anhydride Content (moles/kg) |
|---|---|
| 1 | 0.036 |
| 10 | 0.026 |
| 16 | 0.021 |
| 28 | 0.013 |
| 49 | 0.010 |

Samples of each of the aged aliquots were then compounded on a rubber mill as follows:

| Polymer | 100 g |
|---|---|
| Carbon Black | 20 g |
| "Polygard" | 1 g |
| "Naugard" 445 | 1 g |
| "Carbowax" 4000 | 2 g |
| Hexamethylenediamine Carbamate | 1.25 g |
| Diphenylguanidine | 4 g |

The Mooney scorch test (ASTM-D-1646) was performed at 121° C. The results from the Scorch tests are shown below:

| Sample Age | Mooney Scorch at 121° C. | |
|---|---|---|
| (days) | Minimum Viscosity | 10 pt. rise (min.) |
| 1 | 40 | 5 |
| 10 | 19 | 7 |
| 16 | 16 | 9.2 |
| 28 | 10 | 11.5 |
| 49 | 8 | 12.3 |

This demonstrates the variation in cure characteristics over time when polymer containing an anhydride component is left at ambient conditions. No significant change beyond 49 days is expected.

EXAMPLE 16

Comparison of Treated and Untreated Polymer

A polymer heated at 180° C. until the anhydride content was 0.039 mole/kg was compounded as shown below:

| Compound | A | B |
|---|---|---|
| Polymer | 100 grams | 100 grams |
| Carbon Black (N774) | 20 grams | 20 grams |
| "Polygard" | 1 gram | 1 gram |
| "Naugard" 445 | 1 gram | 1 gram |
| "Carbowax" 4000 | 2 gram | 2 gram |
| Di-n-butylamine | 0.0078 eq. (1 g) | — |
| Water | — | 0.5 grams |

These stocks were allowed to stand at room temperature for two days before adding the curing agents, hexamethylenediamine carbamate (1.25 PHR) and diphenylguanidine (4 PHR). The Mooney scorch test was measured at 121° C.

| Compound | A | B |
|---|---|---|
| Minimum Viscosity | 8.5 | 39 |
| 10 pt. rise, minutes | 13.3 | 7.6 |

Thus after aging only two days the Mooney scorch behavior of the amine treated stock was similar to water treated stock after about six weeks of aging, as determined by extrapolation from the data in Example 15. The measurements taken in Sample B are consistent with the data in Example 15 and emphasize the rapid stabilization of the anhydride containing polymer by treatment with amine.

Industrial Applicability

The process of the present invention can be used to prepare ethylene copolymers such as those disclosed in U.S. Pat. No. 3,904,588, which copolymers are useful in ignition wire jacketing, spark plug boots, hose, belts, miscellaneous molded boots, seals and gaskets. Such copolymers exhibit good low and high temperature physical properties and excellent oil resistance which make them particularly well suited for automotive application.

Best Mode

Although the best mode of the present invention, i.e., the single best set of process parameters of the present invention, will depend upon the particular polymer being prepared and the particular equipment in which the preparation takes place, the most preferred process of the present invention for the preparation of the polymers of U.S. Pat. No. 3,904,588 in experimental quantities is that described in detail in Example 5. Process parameters for the preparation of large scale quantities of such polymers would be adjusted accordingly, and will correspond generally to the description at pages 7–8 of the present application.

I claim:

1. A process for increasing the hydrolytic stability and uniformity, and optionally increasing the molecular weight of random ethylene/methyl acrylate/1,4-butenedioic acid ester copolymer, said copolymer containing 0.5–10 weight percent 1,4-butenedioic acid ester, 40–62 weight percent methyl acrylate, and 28–59.5 weight percent ethylene, said process comprising heating said copolymer to a temperature of 140°-200° C. for a period of at least five minutes, and then contacting the heated copolymer in which the anhydride content is about 0.01-0.1 mole/kg of said heated copolymer with 0.01-0.1 equivalents of amine per kilogram of polymer wherein the amine consists of carbon, hydrogen and nitrogen atoms and is selected from the group consisting of monamines, polyamino compounds, compounds which generate such monoamines and polyamino compounds upon chemical reaction, and mixtures of the above.

2. The process of claim 1 wherein the ethylene/alkyl acrylate/1,4-butenedioic acid ester copolymer is heated to 150°-180° C. for 5-15 minutes.

3. The process of claim 1 wherein the amine is a mixture of mono- and diamines.

4. The process of claim 1 wherein the amine is selected from the group consisting of dibutylamine, hexamethylenediamine, ethylenediamine, methylenedianiline, diethylenetriamine, tetraethylenepentamine and mixtures of the above.

5. The process of claim 1 wherein the amine is a mixture of hexamethylenediamine and dibutylamine.

6. The process of claim 1 wherein the copolymer is contacted with 0.014-0.02 equivalents of amine per kilogram of polymer.

* * * * *